Aug. 25, 1931.   G. KATER   1,820,745
ELECTRIC BREAD TOASTER
Filed Jan. 10, 1929
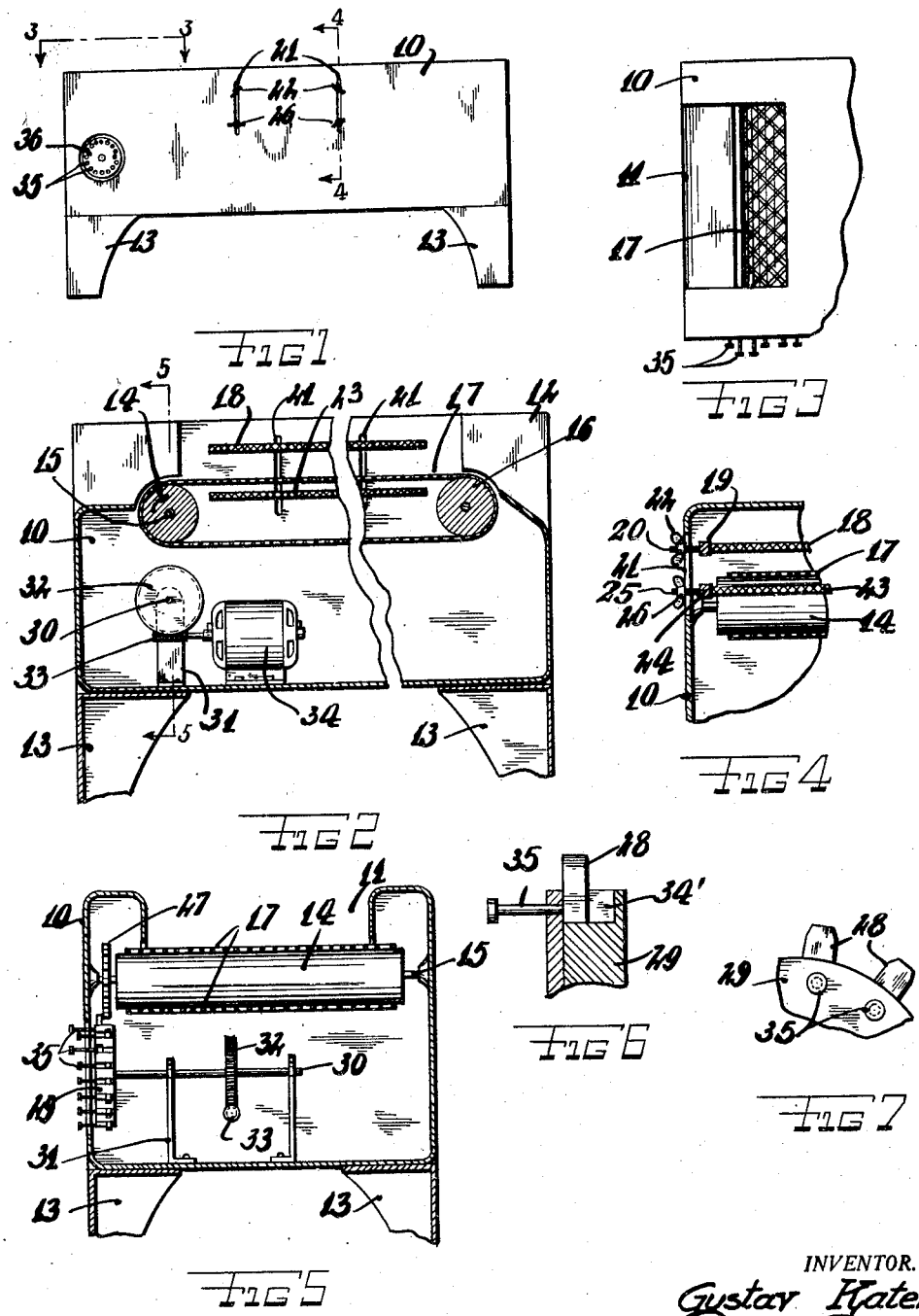
INVENTOR.
Gustav Kater
BY
ATTORNEY Patented Aug. 25, 1931

1,820,745

UNITED STATES PATENT OFFICE

GUSTAV KATER, OF NEW YORK, N. Y.

ELECTRIC BREAD TOASTER

Application filed January 10, 1929. Serial No. 331,654.

This invention relates generally to bread toasters and has more particularly reference to a novel electric bread toaster.

The invention has for an object the provision of a device of the class mentioned, which is of simple durable construction, desirable in use and efficient in action, and which can be manufactured and sold at a reasonable cost.

The invention proposes the use of a horizontal conveyor belt arranged for carrying slices of bread between two heating units. A means is provided for changing the speed of the conveyor belt so that the bread may be toasted to various degrees, and the heating elements are adjustable for assuming various fixed positions from the conveyor belt.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:—

Fig. 1 is a side elevational view of a device constructed according to this invention.

Fig. 2 is a central vertical sectional view thereof.

Fig. 3 is a fragmentary plan view looking in the direction of the line 3—3 of Fig. 1.

Fig. 4 is a fragmentary transverse vertical sectional view, taken on the line 4—4 of Fig. 1.

Fig. 5 is a transverse vertical sectional view, taken on the line 5—5 of Fig. 2.

Fig. 6 is a fragmentary sectional view of the speed adjustment gear shown in Fig. 5.

Fig. 7 is a fragmentary side elevational view thereof.

The reference numeral 10 indicates generally a casing of hollow construction provided with a bread entrance opening 11 and a bread exit opening 12. Support legs 13 serve for supporting the casing on a table or other suitable place.

A conveyor belt driver roller 14 is fixed upon a shaft 15 rotatively mounted within the casing in the vicinity of the entrance opening 11 and an idler roller 16 is rotatively mounted within the casing in the vicinity of the exit opening 12. An endless conveyor belt engages upon these rollers so that a portion of the belt is reachable thru the entrance opening 11 permitting the placing of slices of bread thereon, and another portion of the belt serves to drop the toasted slices out from the casing 10.

A top heating unit 18 has heat insulators 19 on its edges and screws 20 projecting therefrom and thru slots 21 formed in the casing 10. Wing nuts 22 engage upon the screws 20 for holding the heat units in desired vertical positions, the said slots 21 being vertical as seen in Fig. 1. A bottom heating unit 23 is also provided with heat insulators 24 and screws 25 projecting therefrom and thru the same slots 21 and engaged by wing nuts 26 for locking the heating unit in desired positions. The top heating unit engages above the top strip of the conveyor belt 17 and the bottom heating unit engages beneath the top strip of the conveyor belt as may be seen in Fig. 2.

The shaft 15 is provided with a gear 27 arranged for meshing with the teeth 28 of a wheel 29 fixed upon a shaft 30 rotatively supported in standards 31 attached within the casing 10. A worm wheel 32 is fixed on the shaft 30 and meshes with a worm pinion 33 on the shaft of an electric motor 34.

The wheel 29 is formed with a plurality of transverse peripheral grooves 34' and the teeth 28 are slidable in these grooves. A handle 35 connects with each gear tooth for moving it from one end to the other end of the grooves. The casing 10 is provided with an opening 36 thru which handles 35 project. In the retracted positions of the handles 35 the gear teeth 28 are in line and mesh with the gear 27 and in drawn positions of the handles 35 the teeth 28 are out of line of the gear 27.

In operation of the device the motor operates for driving the wheel 29. Upon rotation of this wheel the gear teeth 28 thereon engage with the gear 27 for driving the roller 14 and the conveyor belt. The speed of rotation of the driver roller 14 depends upon the number of teeth 28 which are in line for engaging against the gear 27. The teeth 28 out of line of the gear 27 do not act to rotate the gear 27 and thus reduce the rotation of the driver roller 14. The handles 35 may be manually moved for moving the teeth 28 for speeding up the conveyor belt 17 or for retarding the speed of the conveyor belt according to the desired amount that the bread is intended to be toasted.

While I have shown and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:—

In a device of the class described, a casing, an endless conveyor therein, a gear adjacent an opening in the casing and fixed upon a driver shaft, another gear meshing with said gear and connected for moving said conveyor, the gear teeth of said first gear being slidably mounted so as to be movable to a position out of mesh with the teeth of said second gear, and rods with handles attached on the movable gear teeth and extending thru said opening so that the speed of the conveyor may be adjusted from the exterior of the casing by movements of said handles.

In testimony whereof I have affixed my signature.

GUSTAV KATER.